UNITED STATES PATENT OFFICE.

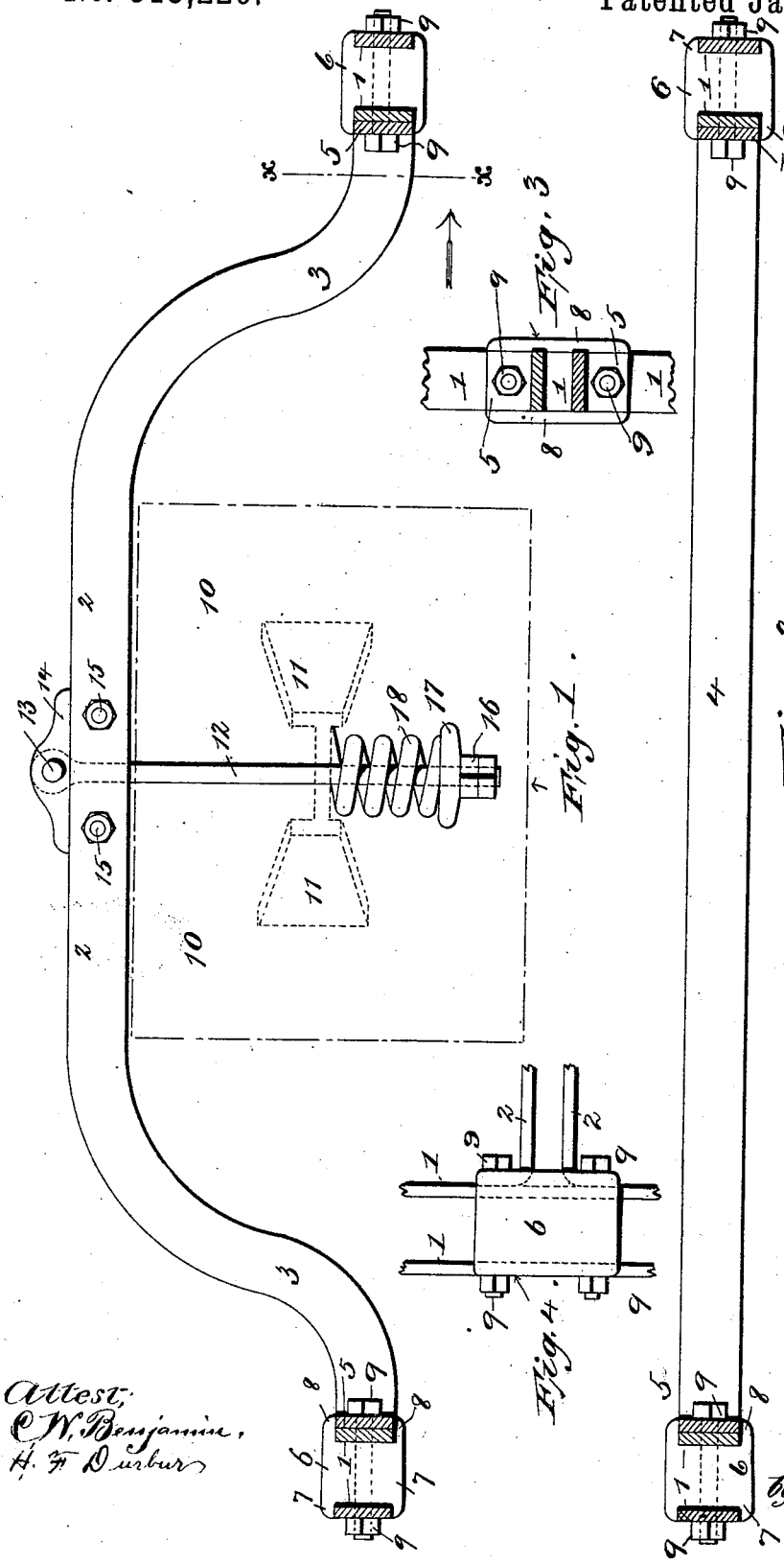

WALTER S. ADAMS, OF PHILADELPHIA, PENNSYLVANIA, ASSIGNOR TO JOHN A. BRILL, OF SAME PLACE.

MOTOR-SUPPORT FOR MOTOR-TRUCKS.

SPECIFICATION forming part of Letters Patent No. 513,226, dated January 23, 1894.

Original application filed November 12, 1891, Serial No. 411,752. Divided and this application filed October 10, 1893. Serial No. 487,747. (No model.)

*To all whom it may concern:*

Be it known that I, WALTER S. ADAMS, a citizen of the United States, residing at Philadelphia, in the county of Philadelphia and State of Pennsylvania, have made certain new and useful Improvements in Motor-Supports for Motor-Trucks, of which the following is a specification.

My invention relates to that class of devices for supporting the free end of the motor wherein the motor is usually sleeved upon one of the axles of the truck and its free end supported from a suitable portion of a truck framing, and my invention consists therefore in a structure adapted to so support the free end of a motor so secured upon the axle, or to support the free ends of what are termed gearless motors wherein the armature of the motor is fast to the truck axle and the field magnets supported about the axle.

My invention resides therefore in the structure shown and described herein and further pointed out in the claims.

In the drawings—Figure 1 is a front elevation, partly in section, of my support secured to the truck frame, showing the free end of a motor supported thereby; Fig. 2, a front elevation of a modified form partly in section; Fig. 3, an inside sectional elevation on the line $x$ $x$, Fig. 1, looking in the direction of the arrow; and Fig. 4, a detached plan view of one end of the support showing its thimble connection with the truck frame.

Similar figures of reference refer to like parts throughout the several views.

At 1 in the drawings are the side bars of what is called the axle box frame which is usually composed of single or multiple bars supported upon the axle boxes in such a way as to be substantially independent of the movement of the car body on the truck springs up and down, such a form being shown in the patent to Brill and Adams for motor truck, No. 504,149, dated August 29, 1893, to which cross reference is here made, to which patent the herein described motor support has special reference, this case being a divisional of the former.

The support in this case is formed either by one or more cross bars 2 set on edge, and either disposed in the form of an arch, as shown in Fig. 1, having the reversed curve portions 3, or the straight cross bars 4, as shown in Fig. 2, the ends of the bars in both cases being bent or enlarged outwardly as at 5. Between the side bars 1, at a point where it is desired to connect the motor support therewith, is located a casting or thimble 6, which is provided with recesses on both sides formed by the top and bottom lips 7, 8, the outer side bar being placed within the recess formed by the lip 7, the inner recess formed by the lip 8 being deeper than the outer recess, and within which the inner side bar and the bent ends 5 of the cross bar are placed and secured if desired.

By reference to Fig. 4 it will be seen that the cross bars, either 2 or 4, are located a short distance from each other and that their bent ends extend in opposite directions, and by reference to either Figs. 1 or 2 it will be seen that these bent ends find a bearing to resist downward pressure upon the lips 8 of the thimble 6. The bent ends of the cross bars, the thimble and side bars 1 are all provided with corresponding apertures through which is passed bolts 9 for securing the thimble, side bars and cross bars together. The bolts rigidly secure the side bars and thimbles together, but their presence in the connection between the ends of the cross bars and the thimbles for supporting said cross bars is not absolutely essential for the purpose of resisting pressure or downward strain, as the lips 8 are intended to take this strain entirely, the only function performed in this regard by the bolts being to keep the cross bars in place and also to strongly unite the cross bars of both sides of the truck into a single frame; so that it will be seen that the lips 8 of the thimble 6 relieve the bolts 9 of all strain due to upward or downward movement or stress of the side bars, and it will be further seen that the lipped thimble not only forms a ready means for uniting the side bars into a component structure but affords efficient means for securing the cross bars to the side bars.

I am aware that it is not new to form an axle box frame for a truck of juxtaposed and flat bars disposed on edge by one or more thimbles inserted between them and united by bolts; nor is it new to unite side bars so constructed (or otherwise) by juxtaposed cross bars disposed edge upward, but I consider myself to be the first to have so united these parts by the specific structure shown herein.

Instead of bending the web of the cross bar at an angle to enable the securing bolts to be passed through, it is plain that the ends can be formed by upsetting the metal at that point, or by forging a lug or projection thereon, all of which will increase the operative width of the bar at that point for the purposes specified.

Referring to Fig. 1, the motor is shown at 10 (in dotted lines) and the free end or nose thereof at 11 (likewise illustrated), and from the arched portions of the cross bar 2 hangs a pendent bolt or hanger 12, the upper end of which is secured by a pin 13 in a casting or thimble 14, the thimble lying between the bars, and is provided with an aperture extending through the body thereof so that by the removal of the pin 13 the pendant 12 can be withdrawn through it and while suspended thereby can have lateral motion therein by the pin 13. Bolts 15 secure the thimble and bars 2 together. The lower portion of the thimble 12 is provided with nuts 16 and a spring cup or plate 17 upon which rests a spiral spring 18 upon which in its turn lies the nose of the motor; and if desired a like spring can be located above the nose of the motor and secured in place by nuts and spring cups. Where the straight cross bars 4 are used, the motor hanging as in Fig. 1 can be adopted and suitably arranged, or the motor can be otherwise connected therewith.

I lay no claim in this application to the means for supporting the motor from the cross bars, the same forming part of the subject matter of the patent before referred to.

Having described my invention, I claim—

1. In combination, the side bars, a cross bar or bars, the web of which extends upwardly, having an outward bend or enlargement on the end or ends adjacent to the side bars, and a thimble having recesses within which both the side bars and the enlarged ends of the cross bar or bars lie, the metal of the thimble resisting downward stress of the cross bars independent of any other connection, substantially as described.

2. The combination with the side bars, of the recessed thimble, the side bars lying within the recesses in said thimble, the cross bar or bars having the arched portion lying above the plane of the side bars, the ends of the cross bar or bars being bent and lying within and supported by the inner recess of said thimble, substantially as described.

3. The combination with the side bars 1, of the thimble 6 having inner and outer longitudinal recesses formed by the lips 7, 8, the inner recess being deeper than the outer recess, the side bars lying within said recess, the cross bars composed of flat metal set on edge having bent ends 5 oppositely disposed, said bent ends lying within the inner recess of the thimble and abutting against the inner side bars, and bolts 9 securing the thimble, side bars, and bent ends of the cross bars together, substantially as described.

Signed at Philadelphia, in the county of Philadelphia and State of Pennsylvania, this 3d day of October, 1893.

WALTER S. ADAMS.

Witnesses:
WM. H. HEULINGS, Jr.,
HENRY C. ESLING.